United States Patent [19]
Nagano et al.

[11] Patent Number: 5,752,090
[45] Date of Patent: May 12, 1998

[54] OPTICAL DEVICE HAVING A LINE OF SIGHT DETECTION APPARATUS

[75] Inventors: Akihiko Nagano, Ichihara; Akira Yamada; Yoshiaki Irie, both of Yokohama, all of Japan

[73] Assignee: Canon Kabushiki Kaisha, Tokyo, Japan

[21] Appl. No.: 907,997

[22] Filed: Aug. 11, 1997

Related U.S. Application Data

[63] Continuation of Ser. No. 585,576, Jan. 16, 1996, abandoned.

[30] Foreign Application Priority Data

Jan. 13, 1995 [JP] Japan ................... 7-019969

[51] Int. Cl.$^6$ ............... G03B 7/08; G03B 13/02; G03B 13/36
[52] U.S. Cl. ............... 396/51; 396/121; 396/147; 396/234; 396/287
[58] Field of Search .............. 396/51, 147, 121, 396/234, 287; 348/346

[56] References Cited

U.S. PATENT DOCUMENTS

| | | | |
|---|---|---|---|
| 4,774,401 | 9/1988 | Yamada et al. | 250/201 |
| 4,788,569 | 11/1988 | Yamada et al. | 354/409 |
| 4,856,869 | 8/1989 | Sakata et al. | 350/162.18 |
| 5,182,443 | 1/1993 | Suda et al. | 250/201.2 |
| 5,245,371 | 9/1993 | Nagano et al. | 354/62 |
| 5,245,381 | 9/1993 | Takagi et al. | 354/471 |
| 5,422,700 | 6/1995 | Suda et al. | 354/402 |
| 5,485,241 | 1/1996 | Irie et al. | 354/410 |
| 5,486,892 | 1/1996 | Suzuki et al. | 354/402 |

*Primary Examiner*—W. B. Perkey
*Attorney, Agent, or Firm*—Fitzpatrick, Cella, Harper & Scinto

[57] ABSTRACT

An optical device having a line of sight detection circuit, includes a line of sight detection circuit for detecting the line of sight of a user, a display member for displaying the position of the line of sight detected by the line of sight detection circuit, an operation unit which can operate in a plurality of operation modes on the basis of information of the line of sight detected by the line of sight detection circuit. The display member changes the display mode for the line of sight position in accordance with the operation mode of the operation unit.

22 Claims, 16 Drawing Sheets

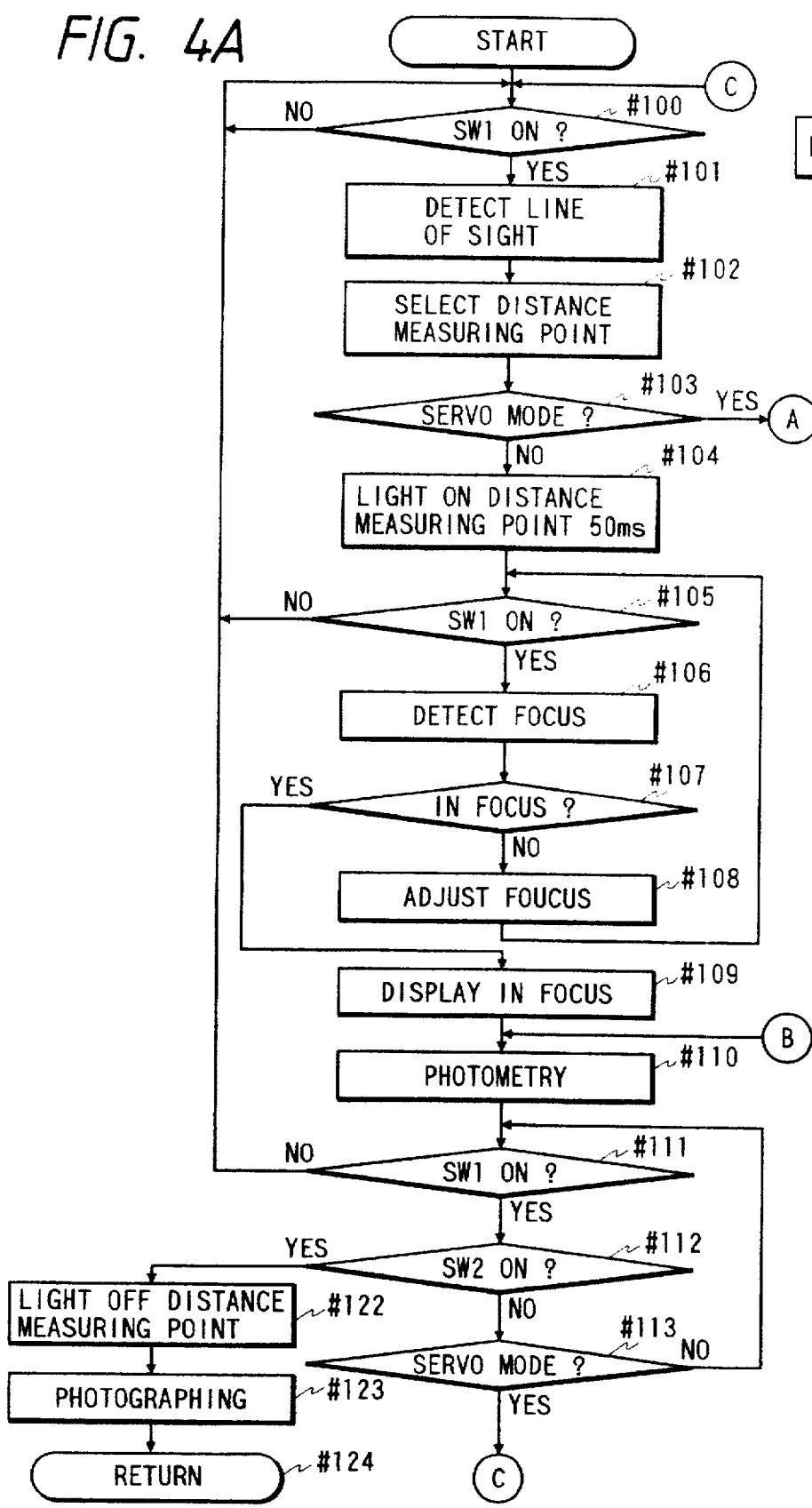

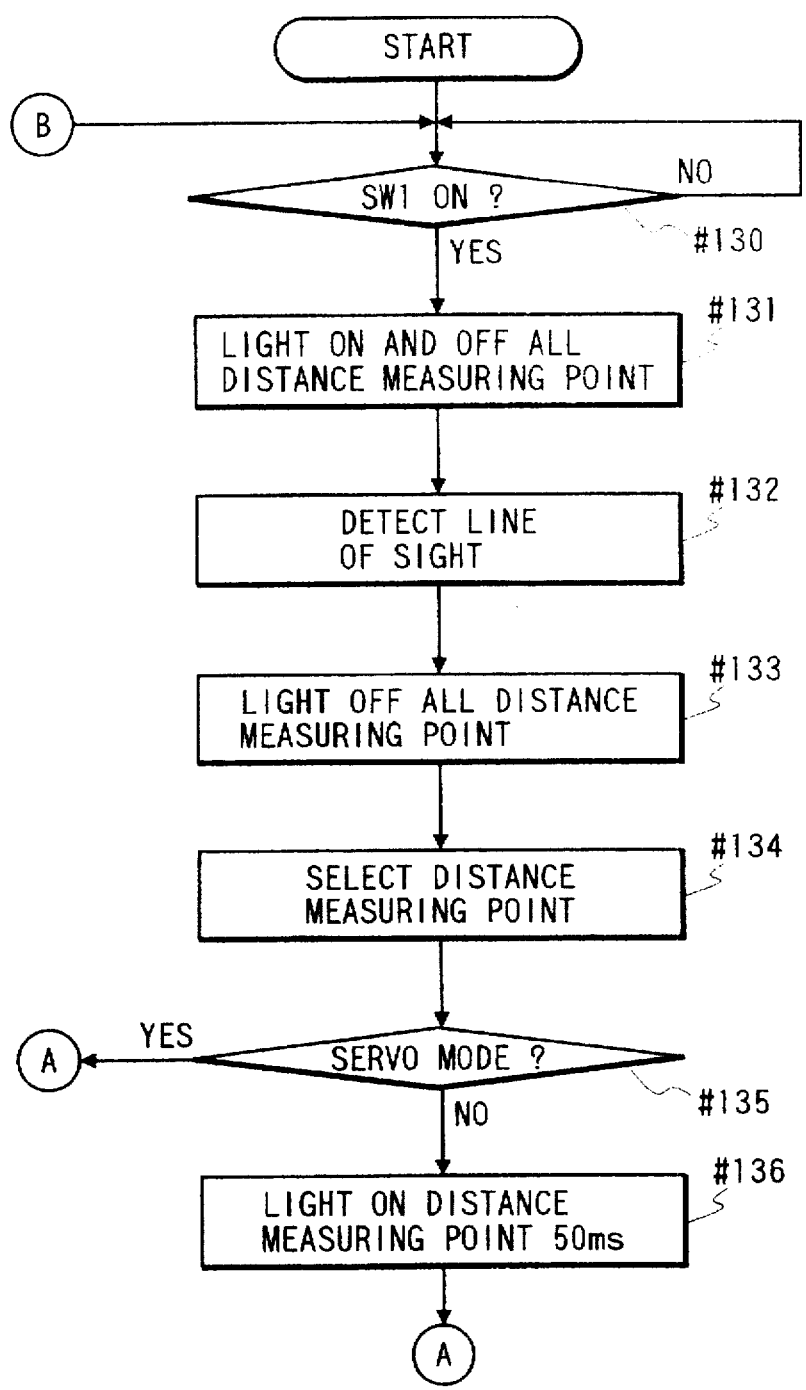

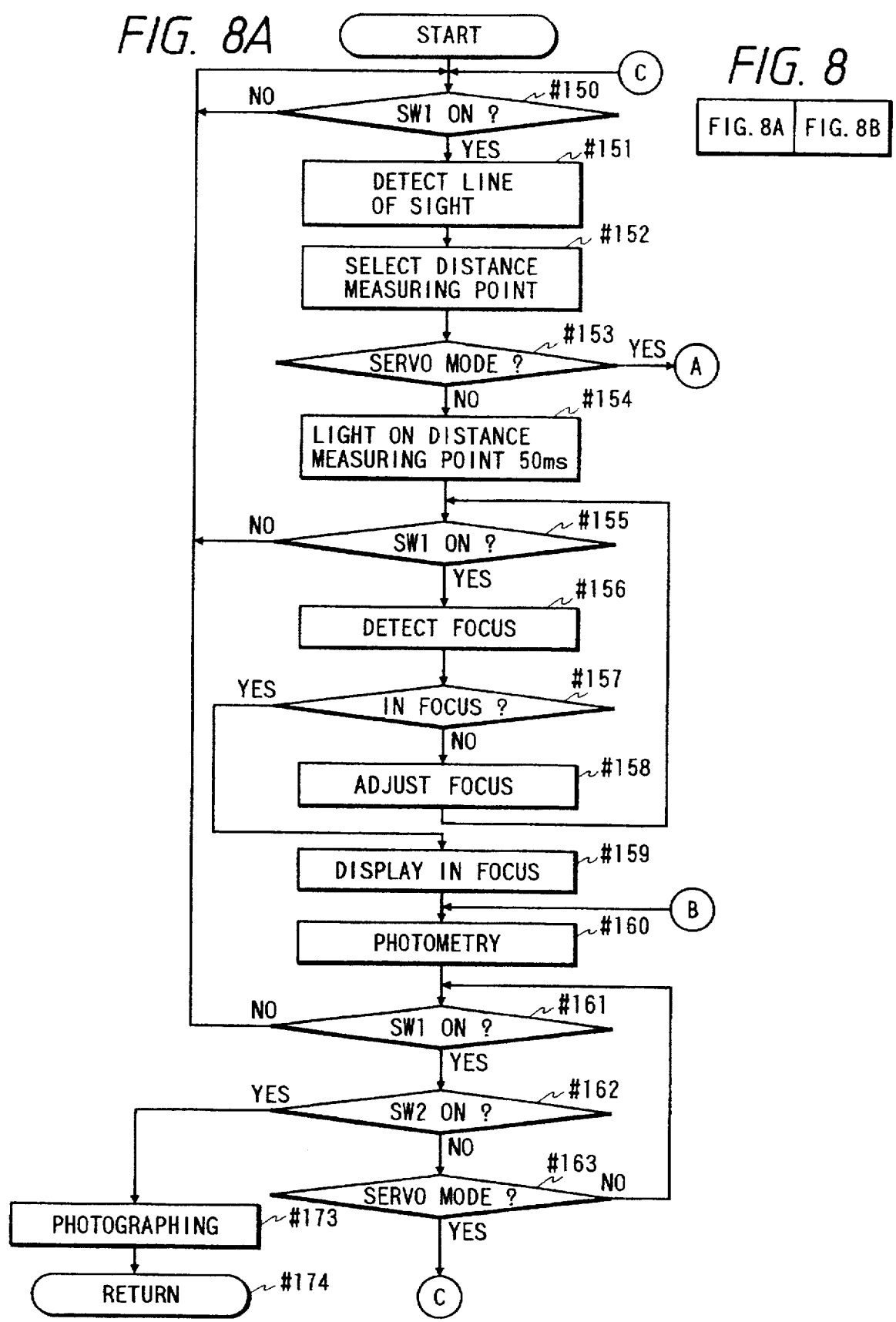

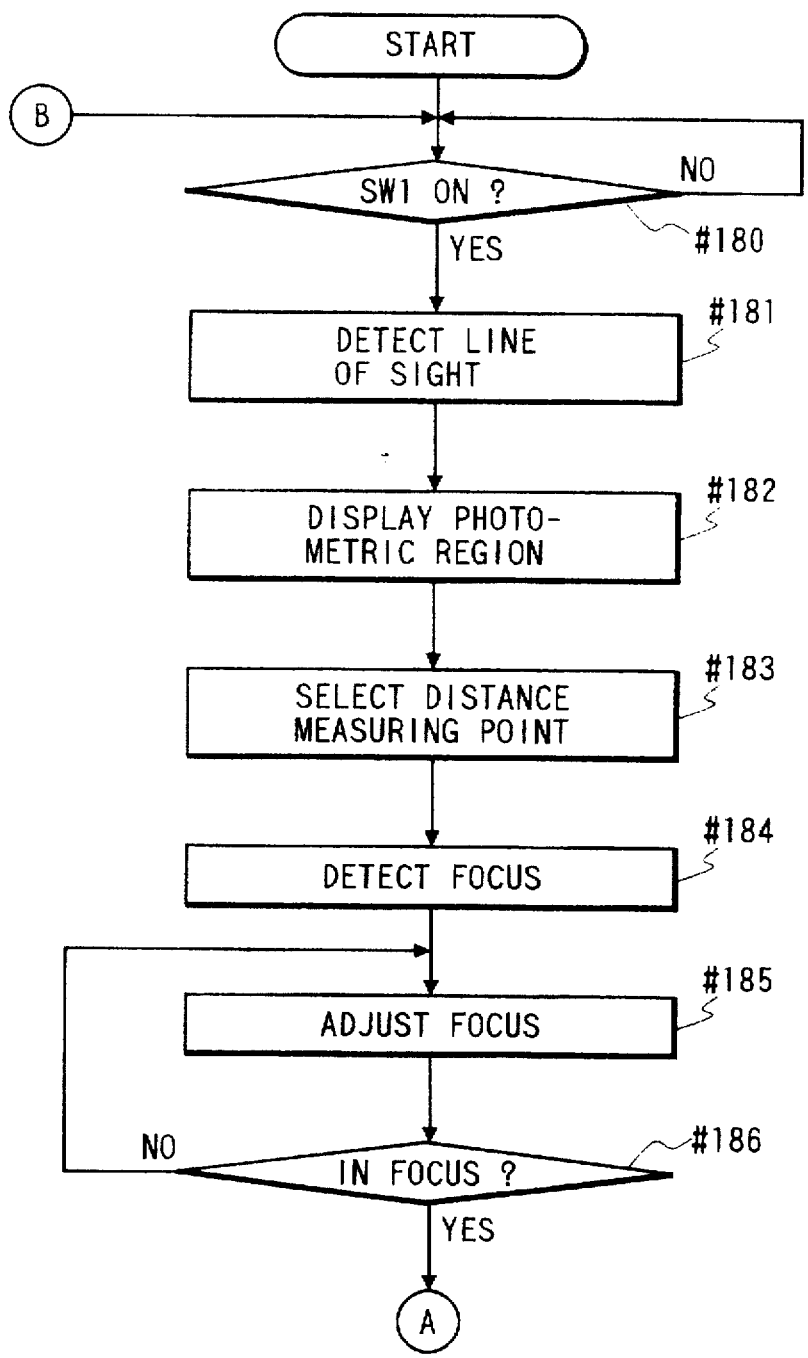

5,752,090

OPTICAL DEVICE HAVING A LINE OF SIGHT DETECTION APPARATUS

This application is a continuation of application Ser. No. 08/585,576 filed Jan. 16, 1996, now abandoned.

BACKGROUND OF THE INVENTION

1. Field of the Invention

The present invention relates to an optical device having a line of sight detection apparatus for detecting the line of sight of a user.

2. Related Background Art

Conventionally, various kinds of apparatuses (e.g., an eye camera) for detecting the observation position of an observer on the object, i.e., the line of sight of the observer have been proposed.

For example, U.S. patent application Ser. No. 08/425,776 discloses a camera, which performs automatic focus adjustment of a phototaking lens on the basis of the line of sight information of a photographer.

In this reference, the camera selects a focus detection region on the basis of the line of sight information obtained by line of sight detection means, and performs focus adjustment of the phototaking lens on the basis of focus detection information obtained from the selected focus detection region. At this time, the camera displays the focus detection region selected based on the line of sight information of the photographer in a finder, and the photographer can confirm if the selected focus detection region is the one that he or she intended.

U.S. Pat. No. 5,245,381 discloses a camera comprising line of sight detection means that makes a display in the finder unobtrusive during line of sight detection.

Also U.S. Pat. No. 5,422,700 discloses another camera, which performs automatic focus adjustment of a phototaking lens on the basis of the line of sight information of a photographer.

In the above reference, automatic focus adjustment means of the camera can execute an operation based on a selected one of "one-shot" and "servo" control methods. In the one-shot mode, the camera performs focus adjustment of the phototaking lens on the basis of focal point information of a focus detection region set based on one line of sight information of a photographer obtained by line of sight detection means. In the servo mode, the camera alternately performs detection of the line of sight of the photographer and focus adjustment of the phototaking lens on the basis of focal point information of a focus detection region set based on the line of sight information detected during the detection.

However, when a plurality of operation modes are available like in the automatic focus adjustment means of the above-mentioned camera, if only one display mode or method of the line of sight information of the photographer is available, and must be used regardless of the selected operation mode, the displayed line of sight information interferes with the view of the photographer, and as a result, correct line of sight information cannot be obtained.

Furthermore, when the line of sight information of the photographer is displayed regardless of the operation mode, the line of sight information of the photographer cannot be effectively displayed depending on the operation mode.

It is an object of the present invention to provide an observation apparatus with a line of sight detection function, which apparatus allows an observer to recognize the currently selected operation mode, can obtain correct line of sight information by preventing displayed information associated with the line of sight from interfering with the view of the observer, and can effectively display the line of sight information of the observer to be used in selection of the operation mode.

SUMMARY OF THE INVENTION

One aspect of the invention is to provide an equipment having a line of sight detection apparatus which comprises means for detecting the line of sight of a user, operation means for performing an operation by utilizing the detected line of sight information of the user, and display means for displaying the detected line of sight of the user, wherein a display mode of the display means is varied depending on an operation mode of the operation means, thus improving operability of the equipment.

DESCRIPTION OF THE PREFERRED EMBODIMENTS

The present invention will be described in detail hereinafter with reference to the illustrated embodiments.

(First Embodiment)

Figure 1:
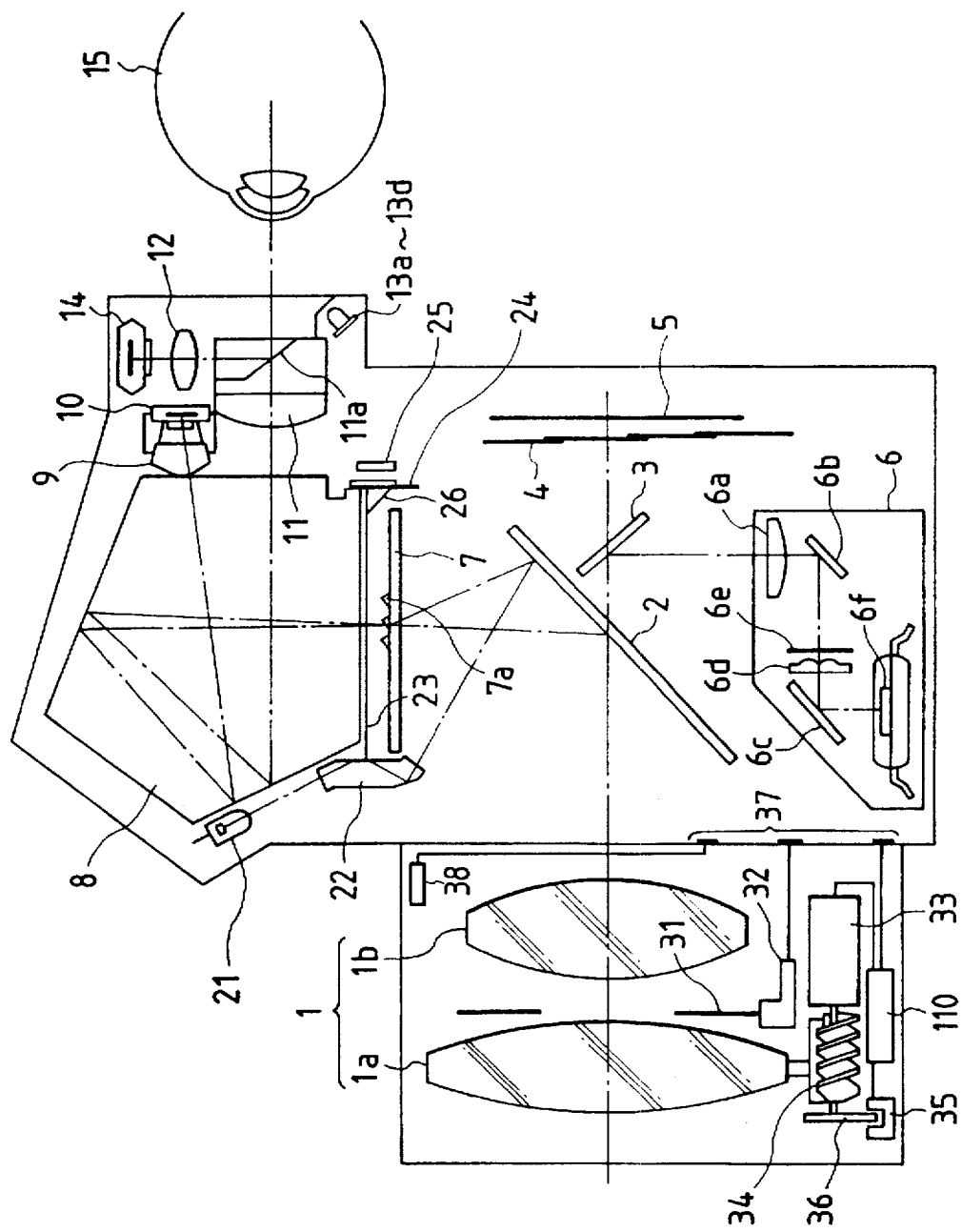
FIG. 1 is a schematic sectional view showing the arrangement of a single-lens reflex camera to which the first embodiment of the present invention is applied.
Figure 2:
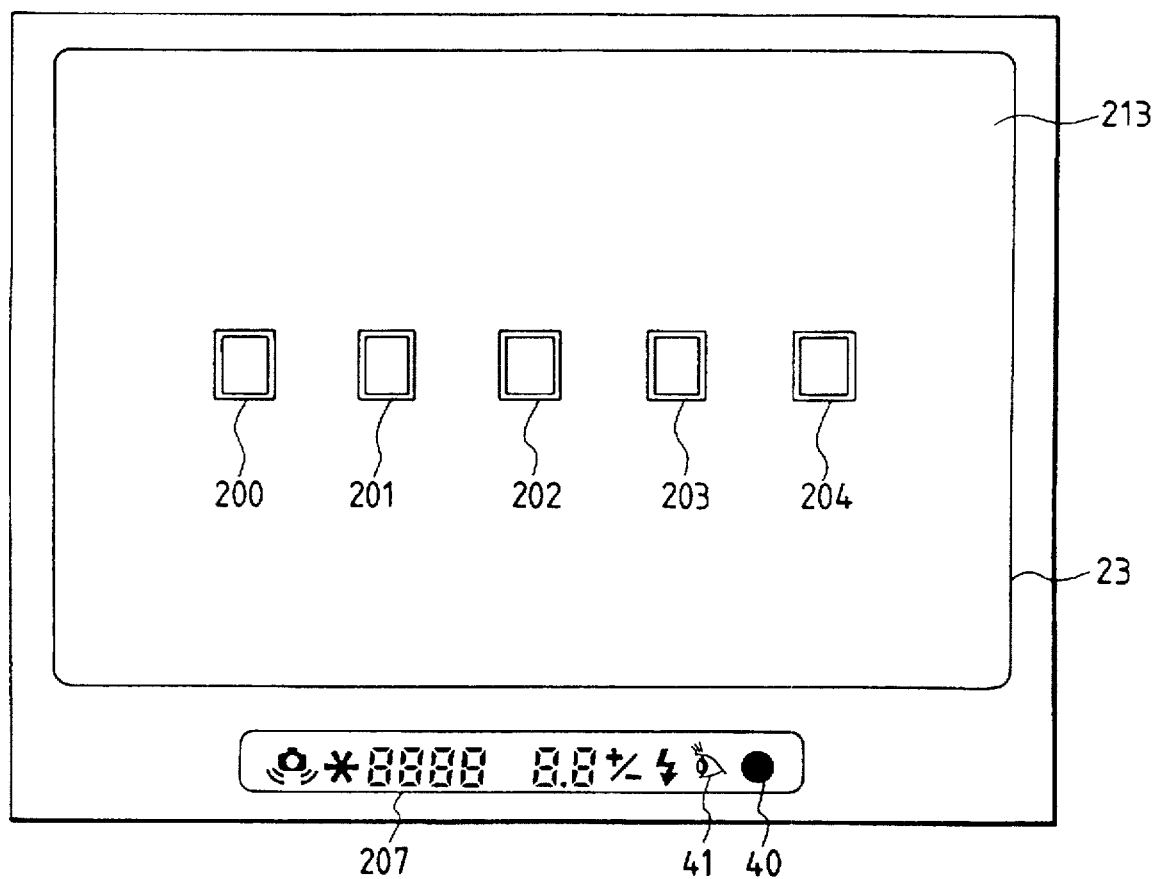
FIG. 2 is a view showing the arrangement in a finder of the camera shown in FIG. 1.

FIGS. 1 to 5B show the first embodiment in which the present invention is applied to a single-lens reflex camera. FIG. 1 is a sectional view showing the arrangement of principal part of the single-lens reflex camera, and FIG. 2 is an explanatory view of the arrangement in the finder of the single-lens reflex camera shown in FIG. 1.

Referring to FIGS. 1 and 2, a phototaking lens 1 is constituted by two lenses 1a and 1b for the sake of simplicity. However, in practice, the lens 1 is constituted by a larger number of lenses. A main mirror 2 is obliquely inserted into or retracted from the phototaking optical path in correspondence with the observation state and the phototaking state of an object image by a finder system. A sub mirror 3 reflects a light beam transmitted through the main mirror 2 downward.

A shutter 4 is arranged behind these mirrors. A photosensitive member 5 comprises a silver halide film or a solid-state image pick-up element such as a CCD, a MOS type element, or the like.

A focus detection device 6 is constituted by a field lens 6a disposed in the vicinity of the imaging surface, reflection mirrors 6b and 6c, a secondary imaging lens 6d, an aperture 6e, a line sensor 6f consisting of a plurality of CCDs (to be described later), and the like.

The focus detection device 6 in this embodiment performs focus detection by a known phase difference method, and can perform focus detection using a plurality of regions (five regions 200 to 204) in an observation screen (finder field) as focus detection regions, as shown in FIG. 2.

A focusing plate 7 is disposed on a prospective imaging surface of the phototaking lens 1, and a pentagonal prism 8 is used for bending the finder optical path. An imaging lens 9 and a photometry sensor 10 are used for measuring the object luminance in the observation screen. The imaging lens 9 defines a conjugate relationship between the focusing plate 7 and the photometry sensor 10 via the reflection optical path in the pentagonal prism 8.

An eyepiece lens 11 is disposed behind the exit surface of the pentagonal prism 8, and is used for observing the focusing plate 7 by an eye 15 of a photographer. The eyepiece lens 11 comprises a beam splitter 11a comprising a dichroic mirror which transmits visible light therethrough and reflects infrared light.

The main mirror 2, the focusing plate 7, the pentagonal prism 8, and the eyepiece lens 11 constitute a finder optical system.

An imaging lens (light-receiving lens) 12 is arranged above the eyepiece lens 11. An image sensor 14 is constituted by two-dimensionally arranging photoelectric conversion element arrays such as CCDs. The image sensor 14 is disposed to be conjugate with a position in the vicinity of the iris of the eye 15 of the photographer, which is located at a predetermined position, with respect to the light-receiving lens 12. Infrared light-emitting diodes (to be referred to as IREDs hereinafter) 13a to 13d serve as illumination light sources, and are arranged around the eyepiece lens 11.

High-luminance superimpose LEDs 21 can be visually confirmed even in a bright object. Each of these LEDs comprises a so-called two-color LED which includes two chip portions and can emit red and green light beams. Light emitted by each superimpose LED 21 is reflected by the main mirror 2 via a light projection prism 22, and is bent in the vertical direction by micro-prism arrays 7a formed on a display portion of the focusing plate 7. Then, the light reaches the eye 15 of the photographer via the pentagonal prism 8 and the eyepiece lens 11.

The micro-prism arrays 7a are formed in frame patterns at a plurality of positions (distance measuring points) corresponding to the focus detection regions on the focusing plate 7, and are respectively illuminated with the corresponding five superimpose LEDs 21 (LED-L1, LED-L2, LED-C, LED-R1, and LED-R2).

As can be seen from the finder field shown in FIG. 2, distance measuring point marks 200, 201, 202, 203, and 204 shine in the finder field to display the focus detection regions (this display will be referred to as a superimpose display hereinafter).

A field mask 23 forms the finder field region. An LCD 24 in the finder is used for displaying phototaking information on a portion outside the finder field, and is illuminated with an illumination LED (F-LED) 25.

Light transmitted through the LCD 24 in the finder is guided into the finder via a triangular prism 26 (see FIG. 1), and is displayed on a portion 207 in FIG. 2 outside the finder field. In this manner, the photographer can recognize various kinds of phototaking information.

The phototaking lens 1 includes an aperture 31, an aperture driving device 32 including an aperture driving circuit 111 (to be described later), a lens driving motor 33, and a lens driving member 34 consisting of, e.g., a driving gear and the like. A photocoupler 35 detects the rotation of a pulse plate 36 interlocked with the lens driving member 34, and supplies the rotation information to a lens focus adjustment circuit 110. The lens focus adjustment circuit 110 drives the lens driving motor 33 by a predetermined amount on the basis of this rotation information and information of a lens driving amount supplied from the camera side, thereby moving the phototaking lens 1 to an in-focus position. Mount contacts 37 serve as a known interface between the camera and the lens.

Figure 3:
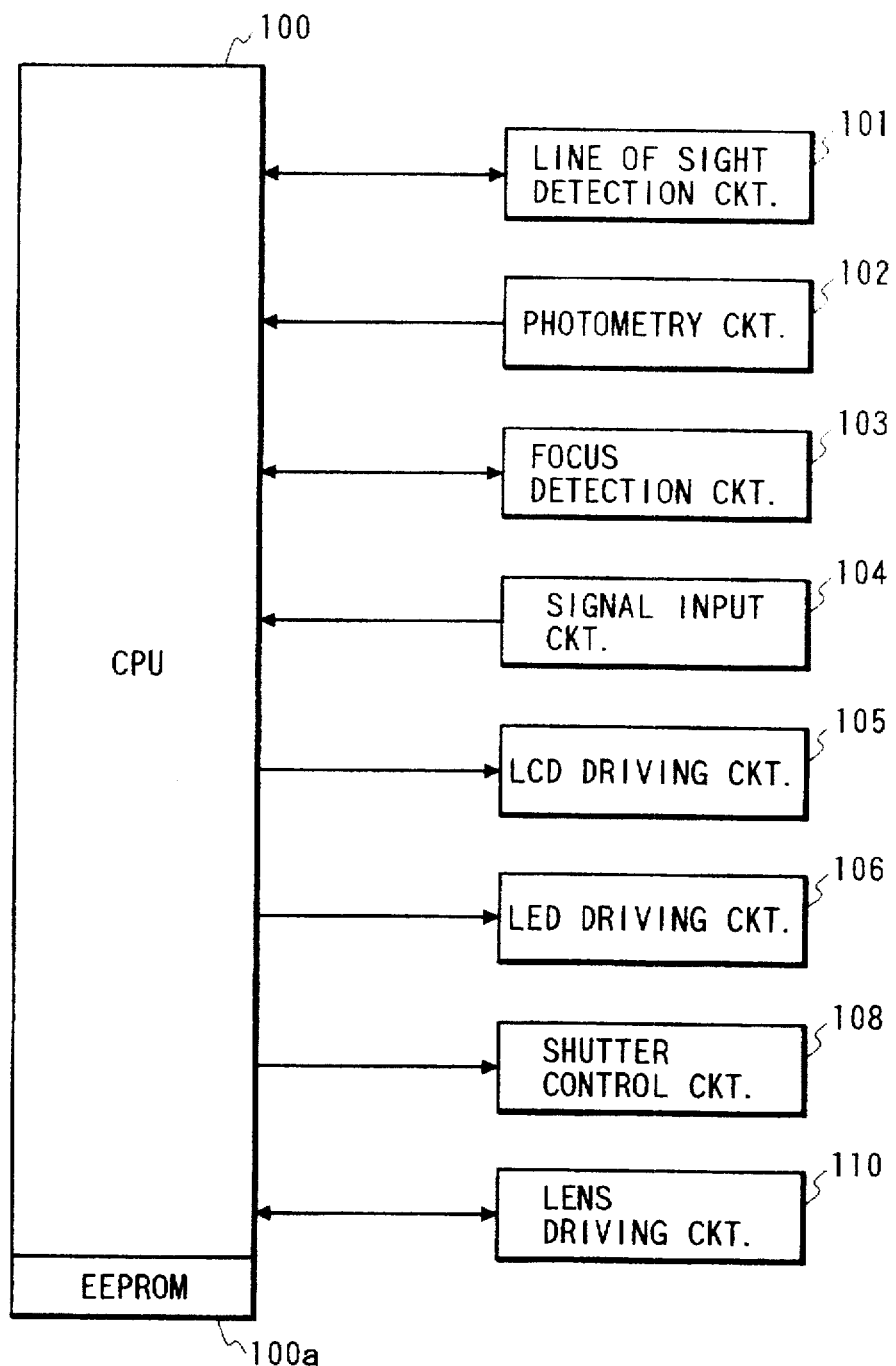
FIG. 3 is a block diagram showing the arrangement of principal part of the camera shown in FIG. 1.

FIG. 3 is a block diagram showing the electrical arrangement built in the single-lens reflex camera with the above-mentioned arrangement. The same reference numerals in FIG. 3 denote the same parts as in FIG. 1.

A central processing unit (to be referred to as a CPU hereinafter) 100 comprises a microcomputer built in the camera main body. The CPU 100 is connected to a line of sight detection circuit 101, a photometry circuit 102, a focus detection circuit 103, a signal input circuit 104, an LCD driving circuit 105, an LED driving circuit 106, a shutter control circuit 108, and a lens driving circuit 110. The CPU 100 communicates signals with the focus adjustment circuit 110 arranged in the phototaking lens 1 via the mount contacts 37 shown in FIG. 1.

An EEPROM 100a as storage means is connected to the CPU 100.

The line of sight detection circuit 101 ON/OFF-controls the IREDs 13a to 13d to illuminate the eye 15 of the photographer with light. Also, the circuit 101 A/D-converts an eyeball image signal from the image sensor 14, and transmits the image information to the CPU 100. The CPU 100 extracts specific feature points of the eyeball image required for line of sight detection in accordance with a predetermined algorithm, and calculates the line of sight of the photographer on the basis of the positions of the extracted feature points.

The photometry circuit 102 amplifies a signal from the photometry sensor 10, and then log-compresses and A/D-converts the amplified signal. The circuit 102 then transmits the obtained signal to the CPU 100 as luminance information of the respective sensor portions.

The line sensor 6f comprises a known CCD line sensor constituted by five sensors corresponding to the five distance measuring point marks 200 to 204 in the screen shown in FIG. 2. The automatic focus detection circuit 103 A/D-converts a voltage obtained from the line sensor 6f, and supplies the digital data to the CPU 100.

The signal input circuit 104 detects signal inputs from a switch (SW-1) which is turned on at the first stroke position of a shutter release button (not shown) and a switch (SW-2) which is turned on at the second stroke position of the release button, and transmits the detected signals to the CPU 100. The signal input circuit 104 detects the operation state of a dial (not shown) for changing the control method of control means equipped in the camera as an observation apparatus, and transmits the detection signal to the CPU 100.

The LCD driving circuit 105 has a known arrangement for display-driving an LCD as a liquid crystal display element. The circuit 105 displays the aperture value, shutter speed, selected phototaking mode, and the like on the LCD 24 in the finder in accordance with a signal from the CPU 100.

The LED driving circuit 106 controls the ON/OFF and flicker operations of the illumination LED 25 and the superimpose LEDs 21.

The shutter control circuit 108 controls magnets (not shown) for travelling forward and rearward shutter curtains upon energization, thereby exposing the photosensitive member to a predetermined amount of light.

Note that the line of sight detection means of the present invention comprises a line of sight detection optical system including the IREDs 13a to 13d, the dichroic mirror (beam splitter) 11a, the light-receiving lens 12, and the image sensor 14, the line of sight detection circuit 101, the CPU 100, and the EEPROM 100a in the first embodiment.

The automatic focus adjustment means of the phototaking lens corresponds to the control means of the present invention. The automatic focus adjustment means comprises the focus detection device 6 and the focus detection circuit 103 for detecting the focusing state of the phototaking lens, the lens driving motor 33 for driving the lens of the phototaking lens, the lens driving member 34 consisting of the driving gear and the like, the photocoupler 35, the pulse plate 36 interlocked with the lens driving member 34, and the lens driving circuit 110. The automatic focus adjustment means allows execution of known "one-shot" and "servo" focus adjustment operations.

The display means for displaying the current position of the line of sight of the user in the finder comprises the superimpose LEDs 21, the light projection prism 22, the main mirror 2, the micro prism arrays 7a, and the LED driving circuit 106 for driving the LEDs 21.

Figure 4B:
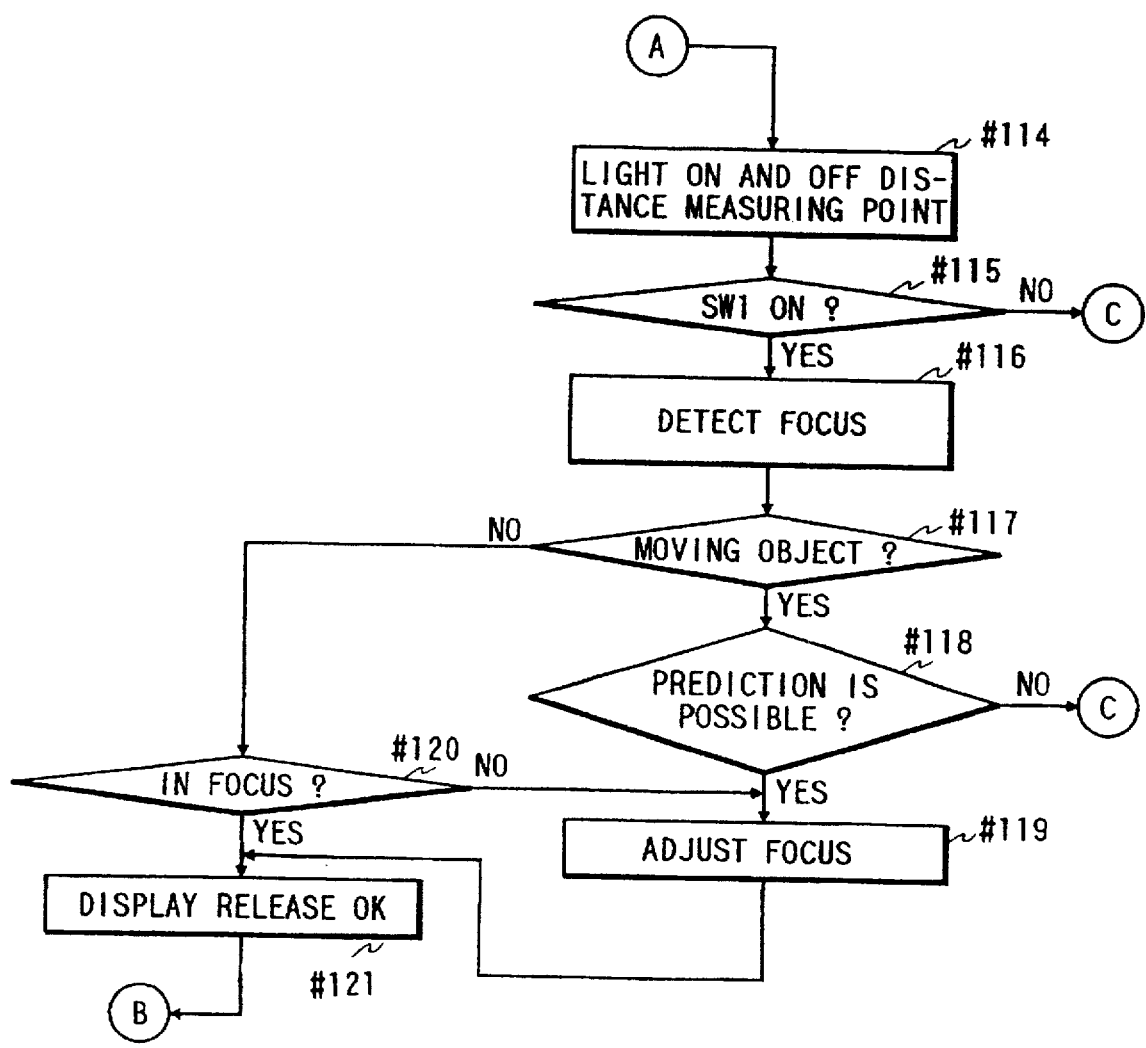
FIG. 4, which is comprised of FIGS. 4A and 4B, is a flow chart showing the operation of the camera shown in FIG. 1.
Figure 5A:
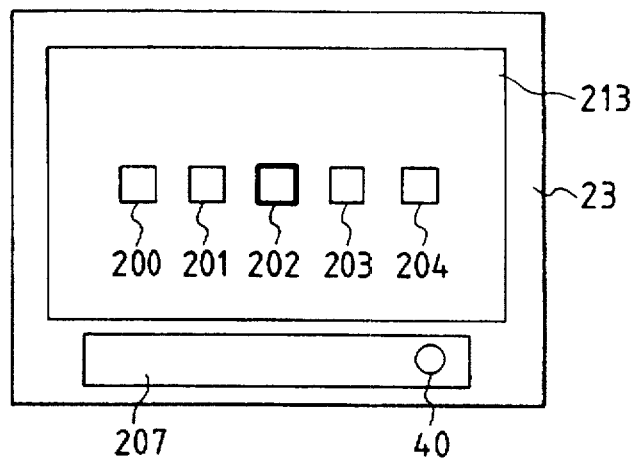
FIGS. 5A and 5B are views showing display examples in the finder to help explain the operation in FIGS. 4A and 4B.
Figure 5B:
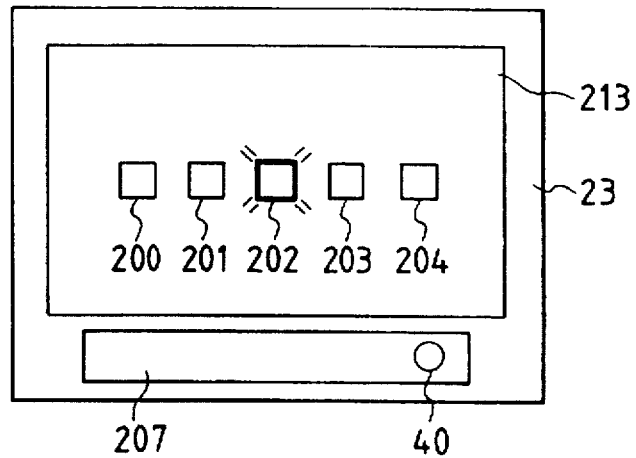

The operation of the camera of this embodiment will be described below with reference to the flow chart in FIGS. 4A and 4B using FIGS. 5A and 5B showing the finder field.

When the photographer starts the camera, the CPU 100 checks the state of the switch SW-1, which is turned on at the first stroke position of the shutter release button, via the signal input circuit 104 (#100). As a result, if the switch SW-1 is not ON, the CPU 100 waits until the switch SW-1 is turned on (#100).

Thereafter, when the photographer turns on the switch SW-1 (#100), the CPU 100 supplies a signal to the line of sight detection circuit 101 to pick up an image of the eyeball of the photographer. Furthermore, the CPU 100 extracts the eyeball image by processing the image obtained from the image sensor 14 via the line of sight detection circuit 101, and calculates the line of sight of the photographer on the basis of the positions of the feature points of the eyeball image (#101). Moreover, the CPU 100 calculates a gazing point on the focusing plate 7 on the basis of the calculated line of sight of the photographer, and selects a focus detection region closest to the coordinate position of the calculated gazing point (#102).

The CPU 100 detects the state of the dial (not shown) via the signal input circuit 104 to confirm the current operation mode of the automatic focus adjustment means. If the automatic focus adjustment means is not set in the servo mode (#103), the CPU 100 transmits a signal to the LED driving circuit 106 to light on the superimpose LED corresponding to, e.g., the focus detection region 202 selected based on the line of sight information of the photographer in the above step for 50 ms (#104), as shown in FIG. 5A.

With this operation, the photographer can recognize the detected line of sight information as the light-on position of the focus detection region. Since the focus detection region 202 is lighted on, the photographer can also recognize that the automatic focus adjustment means is operating in the one-shot mode.

If the photographer determines that the line of sight information displayed in the finder is different from that he or she intended, and turns off the switch SW-1 of the shutter release button (#105), the CPU 100 waits until he or she turns on the switch SW-1 of the shutter release button again (#100).

On the other hand, if the photographer determines that the line of sight information displayed in the finder matches that he or she intended, and keeps the switch SW-1 of the shutter release button ON (#105), the CPU 100 transmits a signal to the focus detection circuit 103 and executes focus detection of the focus detection region selected based on the line of sight information of the photographer (#106). If the focusing state of the selected focus detection region has not reached an in-focus state (#107), the CPU 100 transmits a focus adjustment signal to the lens driving circuit 110 to perform focus adjustment of the phototaking lens 1 (#108). After the lens driving operation corresponding to the focus adjustment signal is executed (#108), the CPU 100 checks the state of the switch SW-1 of the shutter release button again.

If the switch SW-1 of the shutter release button is kept ON (#105), the CPU 100 executes the focus detection of the selected focus detection region again (#106). If the focusing state of the selected focus detection region has reached an in-focus state (#107), the CPU 100 transmits a signal to the LED driving circuit 106 to light on the superimpose LED 21 corresponding to the focus detection region 202, which has reached an in-focus state, for a predetermined period of time (#109).

Since an in-focus display shown in FIG. 5A is performed in the finder field, the photographer can confirm the in-focus state of the phototaking lens on the desired focus detection region.

The CPU 100 transmits a signal to the photometry circuit 102 to perform a photometry operation (#110).

If the switch SW-1 is still kept ON (#111), the CPU 100 checks the state of the switch SW-2 of the shutter release button (#112). If the switch SW-2 is OFF (#112), and the automatic focus adjustment means is not in the servo mode (#113), the CPU 100 checks the state of the switch SW-1 again (#111). On the other hand, if the switch SW-1 is not ON (#111), the CPU 100 waits until the switch SW-1 is turned on (#100).

On the other hand, if the automatic focus adjustment means is in the servo mode (#113), the flow returns to the initial step, and the CPU 100 waits until the switch SW-1 is turned on (#100).

If the switch SW-2 is turned on (#112), the CPU 100 transmits a signal to the LED driving circuit 106 to light off the ON or flickering focus detection region (#122). Furthermore, the CPU 100 transmits a signal to the shutter control circuit 108 to drive the shutter curtains, thus performing a phototaking operation (#123).

Upon completion of the shutter release operation of the camera (#123), the flow returns to the initial waiting state (#124).

Subsequently, the CPU 100 checks the state of the switch SW-1, which is turned on at the first stroke position of the shutter release button, via the signal input circuit 104 (#100). If the photographer turns on the switch SW-1 (#100), the CPU 100 transmits a signal to the line of sight detection circuit 101 to pick up an image of the eyeball of the photographer. Furthermore, the CPU 100 extracts the eyeball image by processing the image obtained from the image sensor 14 via the line of sight detection circuit 101, and calculates the line of sight of the photographer on the basis of the positions of the feature points of the eyeball image (#101). Moreover, the CPU 100 calculates a gazing point on the focusing plate 7 on the basis of the calculated line of sight of the photographer, and selects a focus detection region closest to the coordinate position of the calculated gazing point (#102).

The CPU 100 detects the state of the dial (not shown) via the signal input circuit 104 to confirm the current operation mode of the automatic focus adjustment means. If the automatic focus adjustment means is set in the servo mode (#103), the CPU 100 transmits a signal to the LED driving circuit 106 to flicker the superimpose LED corresponding to the focus detection region selected based on the line of sight information of the photographer in the above step (#114), as shown in FIG. 5B.

In this manner, the photographer can recognize the detected line of sight information as the flickering position of the focus detection region. Since the focus detection region 202 flickers, the photographer can also recognize that the automatic focus adjustment means is controlled in the servo mode.

If the photographer determines that the line of sight information displayed in the finder is different from that he or she intended, and turns off the switch SW-1 of the shutter release button (#115), the CPU 100 waits until he or she turns on the switch SW-1 of the shutter release button again (#100).

On the other hand, if the photographer determines that the line of sight information displayed in the finder matches that he or she intended, and keeps the switch SW-1 of the shutter release button ON (#115), the CPU 100 transmits a signal to the focus detection circuit 103 and executes focus detection of the focus detection region selected based on the line of sight information of the photographer (#116). Furthermore, the CPU 100 checks, by comparing the currently detected focus detection information and the previously detected focus detection information, if the object is a moving object (#117).

If the object is not a moving object (#117), and an in-focus state is attained at the selected distance measuring point (#120), a shutter release OK display indicating that a phototaking operation is ready to perform is performed in the finder field (#121). In FIG. 5B, an in-focus display mark 40 is displayed when the automatic focus detection means is in the servo mode. The CPU 100 transmits a signal to the LCD driving circuit 105 so as to control the LCD 24 in the finder to display the mark 40.

If an in-focus state is not attained on the selected focus detection region (#120), the CPU 100 transmits a focus adjustment signal to the lens driving circuit 110 to perform focus adjustment of the phototaking lens 1 (#119), and performs a shutter release OK display indicating that a phototaking operation is ready to perform in the finder field (#121). Subsequently, the CPU 100 performs a photometry operation (#110), and checks the state of the shutter release button (#111).

On the other hand, if the CPU 100 executes focus detection of a region corresponding to the selected focus detection region selected based on the line of sight information of the photographer (#116), and determines, by comparing the currently detected focus detection information and the previously detected focus detection information, that the object is a moving object (#117), the CPU 100 then checks if the motion of the object is predictable (#118). If the motion of the object is predictable (#118), the CPU 100 executes focus adjustment of the phototaking lens on the basis of the predicted moving amount of the object (#119). On the other hand, if the motion of the object is not predictable (#118), the flow returns to the initial state. Then, the CPU 100 checks the state of the shutter release button (#100), and executes line of sight detection of the photographer (#101).

(Second Embodiment)

Figure 6B:
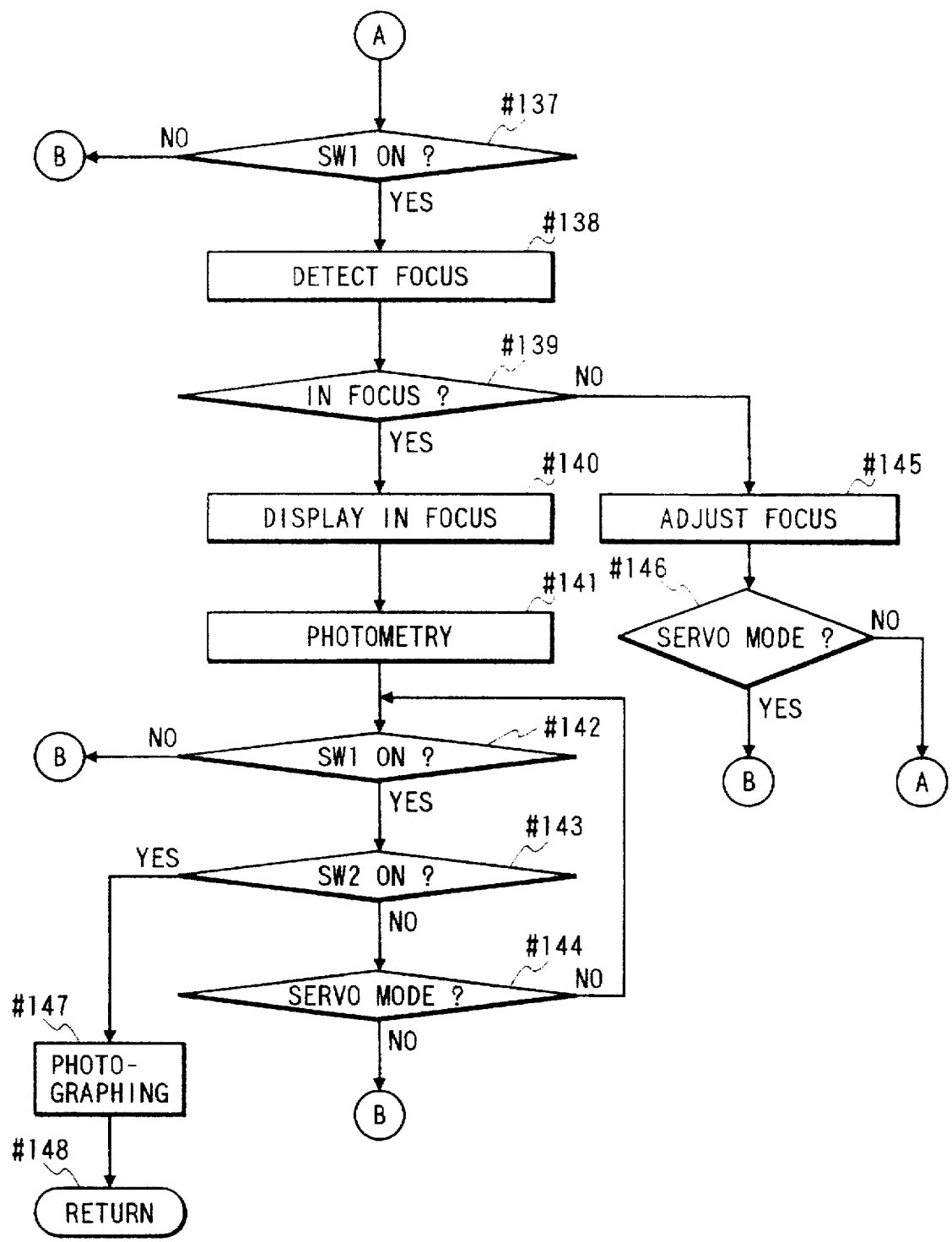
FIG. 6, which is comprised of FIGS. 6A and 6B, is a flow chart showing the operation of a single-lens reflex camera to which the second embodiment of the present invention is applied.
Figure 7A:
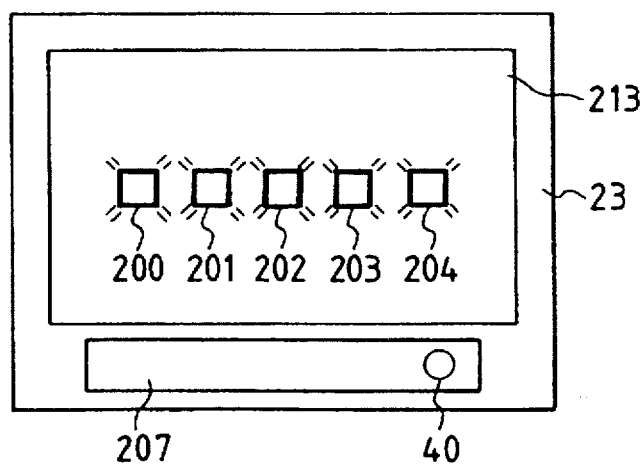
FIGS. 7A to 7C are views showing display examples in the finder to help explain the operation in FIGS. 6A and 6B.
Figure 7B:
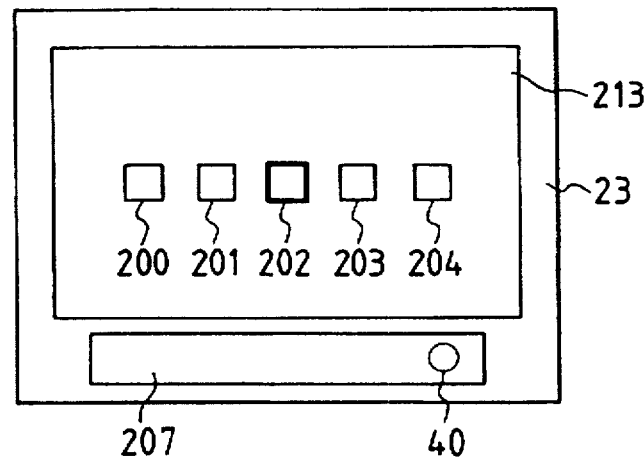
Figure 7C:
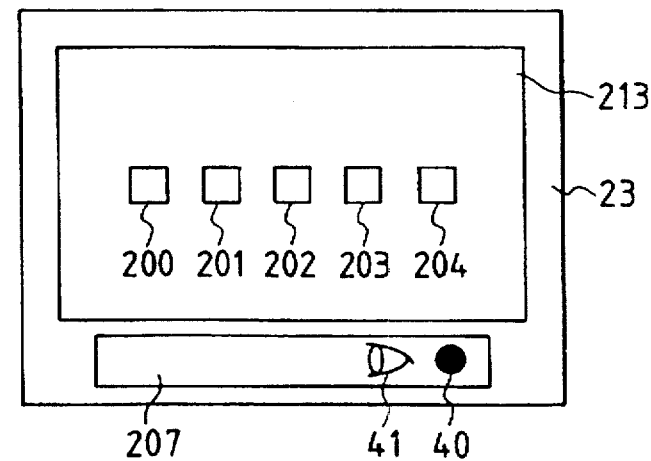

FIGS. 6A and 6B and FIGS. 7A to 7C show the second embodiment of the present invention. FIGS. 6A and 6B are flow charts showing the operation of a camera comprising line of sight detection means, and FIGS. 7A to 7C are views showing the finder field. Note that the mechanical and electrical arrangements of the camera are assumed to be the same as those shown in FIGS. 1 and 3.

As in the first embodiment, the line of sight detection means of this embodiment comprises the line of sight detection optical system including the IREDs 13a to 13d for illuminating the eyeball of a photographer with light, the dichroic mirror 11a for receiving light reflected by the eyeball, the light-receiving lens 12, and the image sensor 14, the line of sight detection circuit 101, the CPU 100, and the EEPROM 100a in the electrical circuit.

As in the first embodiment, the automatic focus adjustment means of the phototaking lens comprises the focus detection device 6 and the focus detection circuit 103 for detecting the focusing state of the phototaking lens, the lens driving motor 33 for driving the lens of the phototaking lens, the lens driving member 34 consisting of a driving gear and the like, the photocoupler 35, the pulse plate 36 interlocked with the lens driving member 34, and the lens driving circuit 110. The automatic focus adjustment means allows execution of known "one-shot" and "servo" focus adjustment operations.

Furthermore, as in the first embodiment, the superimpose display means in the finder comprises an illumination optical system including the superimpose LEDs 21, the light projection prism 22, the main mirror 2, and the micro prism arrays 7a, and the LED driving circuit 106 for driving the LEDs 21.

The operation of the camera with the line of sight detection means will be described below with reference to the flow chart in FIGS. 6A and 6B using FIGS. 7A to 7C showing the finder field.

When the photographer starts the camera, the CPU 100 confirms the state of the switch SW-1, which is turned on at the first stroke position of the shutter release button, via the signal input circuit 104 (#130). If the switch SW-1 is not ON, the CPU 100 waits until the switch SW-1 is turned on (#130).

Thereafter, when the photographer turns on the switch SW-1 (#130), the CPU 100 flickers display marks corresponding to all the focus detection regions in the finder field, as shown in FIG. 7A, so as to cause the photographer to recognize that the camera is detecting the line of sight of the photographer (#131).

Furthermore, the CPU 100 supplies a signal to the line of sight detection circuit 101 to pick up an image of the eyeball of the photographer. The CPU 100 extracts the eyeball image by processing the image obtained from the image sensor 14 via the line of sight detection circuit 101, and calculates the line of sight of the photographer on the basis of the positions of the feature points of the eyeball image (#132). Upon completion of the line of sight detection of the photographer, the CPU 100 transmits a signal to the LED driving circuit 106 to light off the display marks corresponding to all the focus detection regions in the finder field (#133). Moreover, the CPU 100 calculates a gazing point on the focusing plate 7 on the basis of the calculated line of sight of the photographer, and selects a focus detection region closest to the coordinate position of the calculated gazing point (#134).

The CPU 100 detects the state of the dial (not shown) via the signal input circuit 104 to confirm the current operation mode of the automatic focus adjustment means. If the automatic focus adjustment means is not set in the servo mode (#135), the CPU 100 transmits a signal to the LED driving circuit 106 to light on the superimpose LED corresponding to, e.g., the focus detection region 202 selected based on the line of sight information of the photographer in the above step for 50 ms (#136), as shown in FIG. 7B.

With this operation, the photographer can recognize the detected line of sight information as the light-on position of the display mark corresponding to the focus detection region. Since the display mark corresponding to the focus detection region is lighted on, the photographer can also recognize that the automatic focus adjustment means is operating in the one-shot mode.

If the photographer determines that the line of sight information displayed in the finder is different from that he or she intended, and turns off the switch SW-1 of the shutter release button (#137), the CPU 100 waits until he or she turns on the switch SW-1 of the shutter release button again (#130).

On the other hand, if the operation mode of the automatic focus adjustment means is set in the servo mode (#135), the CPU 100 checks the signal input state of the shutter release button via the signal input circuit 104 without displaying any information associated with the line of sight of the photographer (#137).

As shown in FIG. 7C, since the display mark corresponding to the focus detection region in the finder is kept OFF, the photographer can recognize that the automatic focus adjustment means is operating in the servo mode.

Furthermore, if the photographer keeps the switch SW-1 of the shutter release button ON (#137), the CPU 100 transmits a signal to the focus detection circuit 103 to execute focus detection of the focus detection region selected based on the line of sight information of the photographer (#138). If the focusing state of the selected focus detection region has not reached an in-focus state (#139), the CPU 100 transmits a focus adjustment signal to the lens driving circuit 110 to perform focus adjustment of the phototaking lens 1 (#145). At this time, if the automatic focus adjustment means is controlled in the servo mode (#146), the flow returns to the initial state, and the CPU 100 checks the state of the switch SW-1 of the shutter release button (#130). If the switch SW-1 is ON, the CPU 100 executes the line of sight detection of the photographer again.

On the other hand, if the automatic focus detection means is not controlled in the servo mode (#146), the CPU 100 checks the state of the switch SW-1 of the shutter release button again (#137).

If the switch SW-1 of the shutter release button is kept ON (#137), the CPU 100 executes the focus detection of the previously selected focus detection region again (#138). If the focusing state of the selected focus detection region has reached an in-focus state (#139), the CPU 100 transmits a signal to the LCD driving circuit 105 so as to control the LCD 24 in the finder to perform an in-focus display (#140). In this case, the in-focus display mark 40 in FIG. 7C is displayed, and is controlled to be lighted on while the phototaking lens is in an in-focus state.

Furthermore, the CPU 100 transmits a signal to the photometry circuit 102 to perform a photometry operation (#141).

Subsequently, if the switch SW-1 is ON (#142), the CPU 100 checks the state of the switch SW-2 of the shutter release button (#143). If the switch SW-2 is OFF (#143), and the automatic focus adjustment means is not in the servo mode (#144), the CPU 100 checks the state of the switch SW-1 again (#142). If the switch SW-1 is not in the ON state (#142), the CPU 100 waits until the switch SW-1 is turned on (#130).

On the other hand, if the operation mode of the automatic focus adjustment means is the servo mode (#144), the control returns to the initial state, and the CPU 100 waits until the switch SW-1 is turned on (#130).

If the switch SW-2 is turned on (#143), the CPU 100 transmits a signal to the shutter control circuit 108 to drive the shutter curtains, thus performing a phototaking operation (#147). Upon completion of the shutter release operation of the camera (#147), the control returns to the initial waiting state (#148).

In this embodiment, while the line of sight detection operation of the photographer is being executed, the display marks corresponding to all the focus detection regions in the finder flicker. Alternatively, as shown in FIG. 7C, a mark 41 indicating that the line of sight detection is being executed may be provided to the LCD 24 in the finder, and may be displayed.

(Third Embodiment)

Figure 8B:
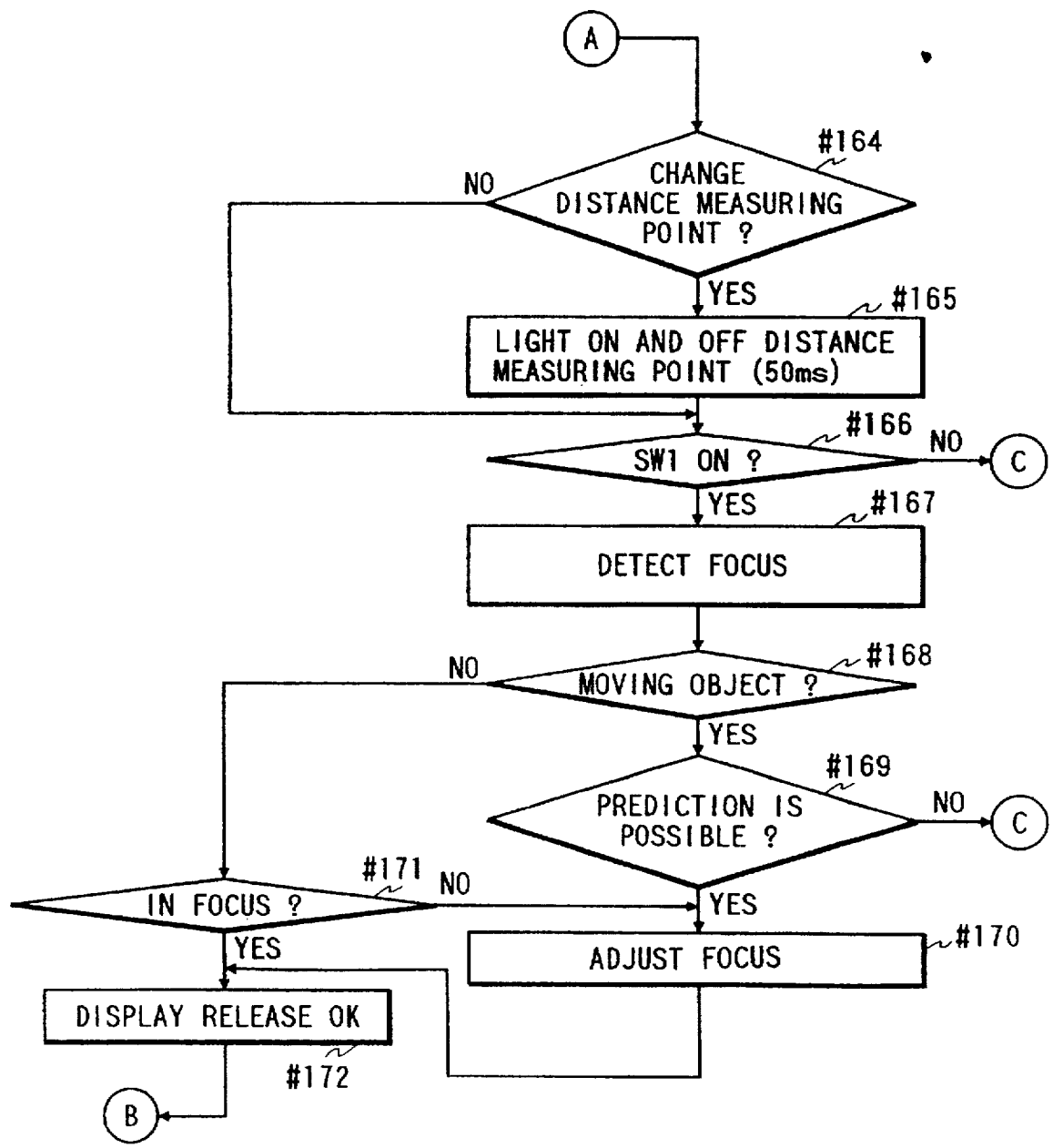
FIG. 8, which is comprised of FIGS. 8A and 8B, is a flow chart showing the operation of a single-lens reflex camera to which the third embodiment of the present invention is applied.
Figure 9A:
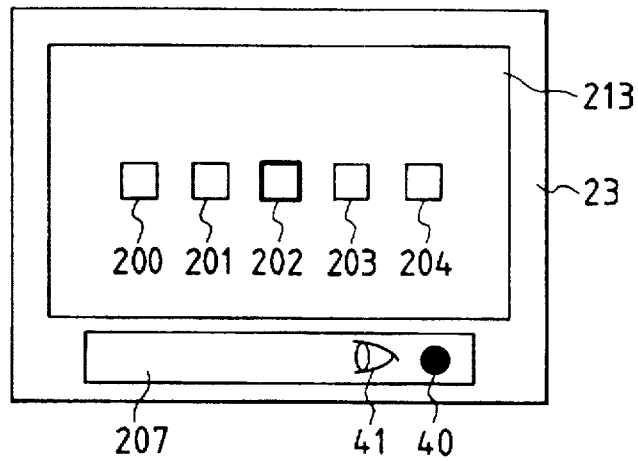
FIGS. 9A and 9B are views showing display examples in the finder to help explain the operation in FIGS. 8A and 8B.
Figure 9B:
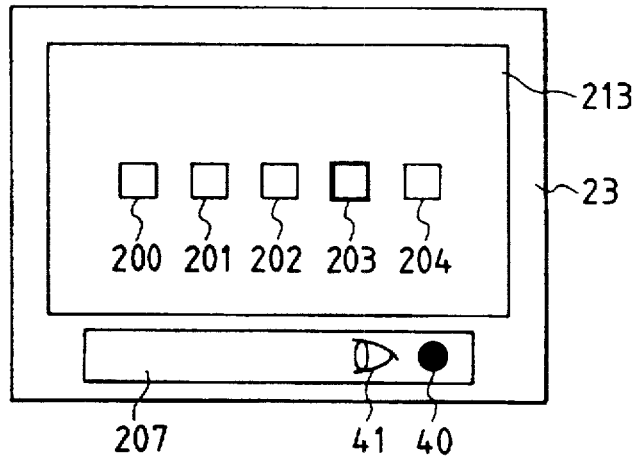

FIGS. 8A, 8B, 9A and 9B show the third embodiment of the present invention. FIGS. 8A and 8B are flow charts showing the operation of a camera with line of sight detection means, and FIGS. 9A and 9B show the finder field. Note that the mechanical and electrical arrangements of the camera are assumed to be the same as those shown in FIGS. 1 and 3.

In this embodiment, the line of sight detection optical system including the IREDs 13a to 13d for illuminating the eyeball of a photographer with light, the dichroic mirror 11a for receiving light reflected by the eyeball, the light-receiving lens 12, and the image sensor 14, the line of sight detection circuit 101, the CPU 100, and the EEPROM 100a in the electrical circuit correspond to the line of sight detection means of the present invention, as in the first embodiment.

As in the first embodiment, the automatic focus adjustment means of the phototaking lens comprises the focus detection device 6 and the focus detection circuit 103 for detecting the focusing state of the phototaking lens, the lens driving motor 33 for driving the lens of the phototaking lens, the lens driving member 34 consisting of a driving gear and the like, the photocoupler 35, the pulse plate 36 interlocked with the lens driving member 34, and the lens driving circuit 110. The automatic focus adjustment means allows execution of known "one-shot" and "servo" focus adjustment operations.

Furthermore, as in the first embodiment, the superimpose display means in the finder comprises an illumination optical system including the superimpose LEDs 21, the light projection prism 22, the main mirror 2, and the micro prism arrays 7a, and the LED driving circuit 106 for driving the LEDs 21.

The operation of the camera with the line of sight detection means will be described below with reference to the flow chart in FIGS. 8A and 8B using FIGS. 9A and 9B showing the finder field.

When the photographer starts the camera, the CPU 100 checks the state of the switch SW-1, which is turned on at the first stroke position of the shutter release button, via the signal input circuit 104 (#150). As a result, if the switch SW-1 is not ON, the CPU 100 waits until the switch SW-1 is turned on (#150).

Thereafter, when the photographer turns on the switch SW-1 (#150), the CPU 100 supplies a signal to the line of sight detection circuit 101 to pick up an image of the eyeball of the photographer. Furthermore, the CPU 100 extracts the eyeball image by processing the image obtained from the image sensor 14 via the line of sight detection circuit 101, and calculates the line of sight of the photographer on the basis of the positions of the feature points of the eyeball image (#151). Moreover, the CPU 100 calculates a gazing point on the focusing plate 7 on the basis of the calculated line of sight of the photographer, and selects a focus detection region closest to the coordinate position of the calculated gazing point (#152).

The CPU 100 detects the state of the dial (not shown) via the signal input circuit 104 to confirm the current operation mode of the automatic focus adjustment means. If the automatic focus adjustment means is not set in the servo mode (#153), the CPU 100 transmits a signal to the LED driving circuit 106 to light on the superimpose LED corresponding to, e.g., the focus detection region 202 selected based on the line of sight information of the photographer in the above step for 50 ms (#154), as shown in FIG. 9A.

With this operation, the photographer can recognize the detected line of sight information as the light-on position of the display mark corresponding to the focus detection region. Since the display mark corresponding to the focus detection region is lighted on, the photographer can also recognize that the automatic focus adjustment means is operating in the one-shot mode.

If the photographer determines that the line of sight information displayed in the finder is different from that he or she intended, and turns off the switch SW-1 of the shutter release button (#155), the CPU 100 waits until he or she turns on the switch SW-1 of the shutter release button again (#150).

On the other hand, if the photographer determines that the line of sight information displayed in the finder matches that he or she intended, and keeps the switch SW-1 of the shutter release button ON (#155), the CPU 100 transmits a signal to the focus detection circuit 103 and executes focus detection of the focus detection region selected based on the line of sight information of the photographer (#156). If the focusing state of the selected focus detection region has not reached an in-focus state (#157), the CPU 100 transmits a focus adjustment signal to the lens driving circuit 110 to perform focus adjustment of the phototaking lens 1 (#158). After the lens driving operation corresponding to the focus adjustment signal is executed (#158), the CPU 100 checks the state of the switch SW-1 of the shutter release button again (#155).

If the switch SW-1 of the shutter release button is kept ON (#155), the CPU 100 executes the focus detection of the previously selected focus detection region again (#156). If the focusing state of the selected focus detection region has reached an in-focus state (#157), the CPU 100 transmits a signal to the LCD driving circuit 105 so as to control the LCD 24 in the finder to light on the in-focus display mark 40 (#159).

In the finder field, since the in-focus display mark 40 shown in FIG. 9A is lighted on, the photographer can recognize that the phototaking lens has reached an in-focus state on the predetermined focus detection region.

The CPU 100 transmits a signal to the photometry circuit 102 to perform a photometry operation (#160).

If the switch SW-1 is kept ON (#161), the CPU 100 checks the state of the switch SW-2 of the shutter release button (#162). If the switch SW-2 is OFF (#162), and the operation mode of the automatic focus adjustment means is not the servo mode (#163), the CPU 100 checks the state of the switch SW-1 again (#161). On the other hand, if the switch SW-1 is not ON (#161), the CPU 100 waits until the switch SW-1 is turned on (#150).

On the other hand, if the operation mode of the automatic focus adjustment means is the servo mode (#163), the flow returns to the initial state, and the CPU 100 waits until the switch SW-1 is turned on (#150).

If the switch SW-2 is turned on (#162), the CPU 100 transmits a signal to the shutter control circuit 108 to drive the shutter curtains, thus performing a phototaking operation (#173).

Upon completion of the shutter release operation of the camera (#173), the flow returns to the initial waiting state (#174).

Subsequently, the CPU 100 checks the state of the switch SW-1, which is turned on at the first stroke position of the shutter release button, via the signal input circuit 104 (#160). If the photographer turns on the switch SW-1 (#160), the CPU 100 transmits a signal to the line of sight detection circuit 101 to pick up an image of the eyeball of the photographer. Furthermore, the CPU 100 extracts the eyeball image by processing the image obtained from the image sensor 14 via the line of sight detection circuit 101, and calculates the line of sight of the photographer on the basis of the positions of the feature points of the eyeball image (#151). Moreover, the CPU 100 calculates a gazing point on the focusing plate 7 on the basis of the calculated line of sight of the photographer, and selects a focus detection region closest to the coordinate position of the calculated gazing point (#152).

The CPU 100 detects the state of the dial (not shown) via the signal input circuit 104 to confirm the current operation mode of the automatic focus adjustment means. If the automatic focus adjustment means is set in the servo mode (#153), the CPU 100 compares the positions of the currently and previously selected focus detection regions. If the focus detection region is changed (#164), the CPU 100 transmits a signal to the LED driving circuit 106 to light on the superimpose LED corresponding to the changed focus detection region 203 for 50 ms (#165), as shown in FIG. 9B.

In this manner, the photographer can recognize the changed line of sight information as the light-on position of the display mark corresponding to the focus detection region.

If the photographer determines that the line of sight information displayed in the finder is different from that he or she intended, and turns off the switch SW-1 of the shutter release button (#166), the CPU 100 waits until he or she turns on the switch SW-1 of the shutter release button again (#150).

On the other hand, if the CPU 100 determines, by comparing the currently and previously selected focus detection regions, that the focus detection region is not changed (#164), the CPU 100 checks the state of the release button without displaying the focus detection region (#166).

In this case, the photographer can confirm whether the automatic focus adjustment means is controlled in the servo mode, since the display mark corresponding to the focus detection region is or is not lighted on based on the line of sight information of the photographer.

Subsequently, if the photographer keeps the switch SW-1 of the shutter release button ON (#166), the CPU 100 transmits a signal to the focus detection circuit 103 and executes focus detection of the focus detection region selected based on the line of sight information of the photographer (#167). Furthermore, the CPU 100 checks, by comparing the currently detected focus detection information and the previously detected focus detection information, if the object is a moving object (#168).

If the object is not a moving object (#168), and an in-focus state of the phototaking lens is attained on the selected focus detection region (#171), a shutter release OK display indicating that a phototaking operation is ready to perform is performed in the finder field (#172). In this case, the in-focus display mark 40 shown in FIG. 9B is displayed. The CPU 100 transmits a signal to the LCD driving circuit 105 so as to control the LCD 24 in the finder to display the mark 40.

If an in-focus state is not attained on the selected focus detection region (#172), the CPU 100 transmits a focus adjustment signal to the lens driving circuit 110 to perform focus adjustment of the phototaking lens 1 (#170), and performs a shutter release OK display indicating that a phototaking operation is ready to perform in the finder field (#172). Subsequently, the CPU 100 performs a photometry operation (#160), and checks the state of the shutter release button (#161).

On the other hand, if the CPU 100 determines, by comparing the currently and previously selected focus detection regions, that the focus detection region is not changed (#164), the CPU 100 checks the state of the shutter release button without displaying the focus detection region (#166).

In this case, the photographer can confirm whether the automatic focus adjustment means is controlled in the servo mode, since the display mark corresponding to the focus detection region is or is not lighted on based on the line of sight information of the photographer.

If the photographer keeps the switch SW-1 of the shutter release button ON (#166), the CPU 100 transmits a signal to the focus detection circuit 103 to execute the focus detection of the focus detection region selected based on the line of sight information of the photographer (#167). Furthermore, the CPU 100 checks, by comparing the currently detected focus detection information and the previously detected focus detection information, if the object is a moving object (#168).

If the object is not a moving object (#168), and an in-focus state of the phototaking lens is attained on the selected focus detection region (#171), a shutter release OK display indicating that a phototaking operation is ready to perform is performed in the finder field (#172). In this case, the in-focus display mark 40 shown in FIG. 9B is displayed. The CPU 100 transmits a signal to the LCD driving circuit 105 so as to control the LCD 24 in the finder to display the mark 40.

If an in-focus state is not attained on the selected focus detection region (#171), the CPU 100 transmits a focus adjustment signal to the lens driving circuit 110 to perform focus adjustment of the phototaking lens 1 (#170), and performs a shutter release OK display indicating that a phototaking operation is ready to perform in the finder field (#172). Subsequently, the CPU 100 performs a photometry operation (#160), and checks the state of the shutter release button (#161).

On the other hand, if the CPU 100 executes the focus detection of the focus detection region selected based on the line of sight information of the photographer (#167), and determines, by comparing the currently detected focus detection information and the previously detected focus detection information, that the object is a moving object (#168), the CPU 100 then checks if the motion of the object is predictable (#169). If the motion of the object is predictable (#169), the CPU 100 executes the focus adjustment of the phototaking lens on the basis of the predicted moving amount of the object (#170).

If the motion of the object is not predictable (#169), the control returns to the initial state. Then, the CPU 100 checks the state of the shutter release button (#150), and executes the line of sight detection of the photographer (#151).

(Fourth Embodiment)

Figure 10:
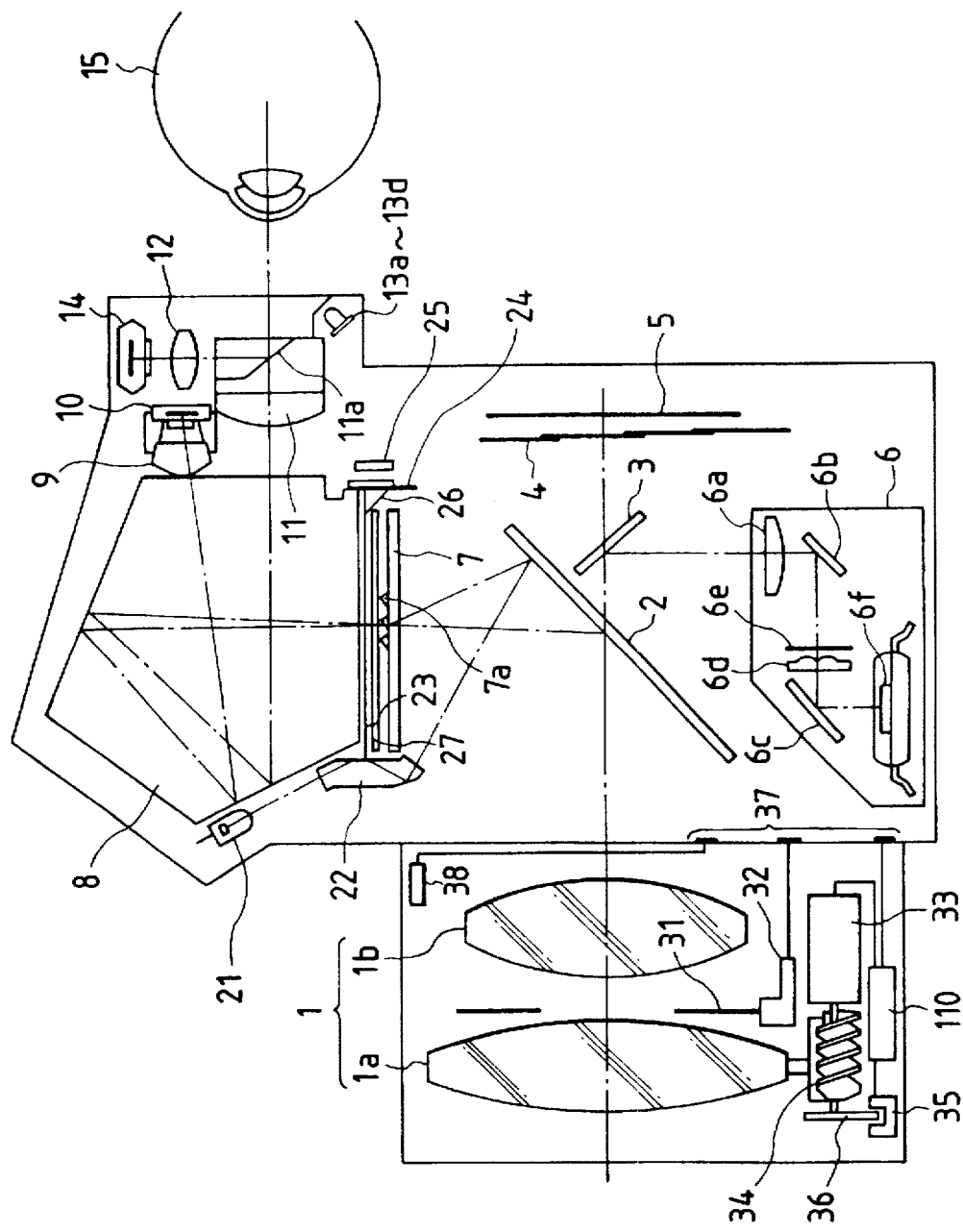
FIG. 10 is a schematic sectional view showing the arrangement of a single-lens reflex camera to which the third embodiment of the present invention is applied.
Figure 11B:
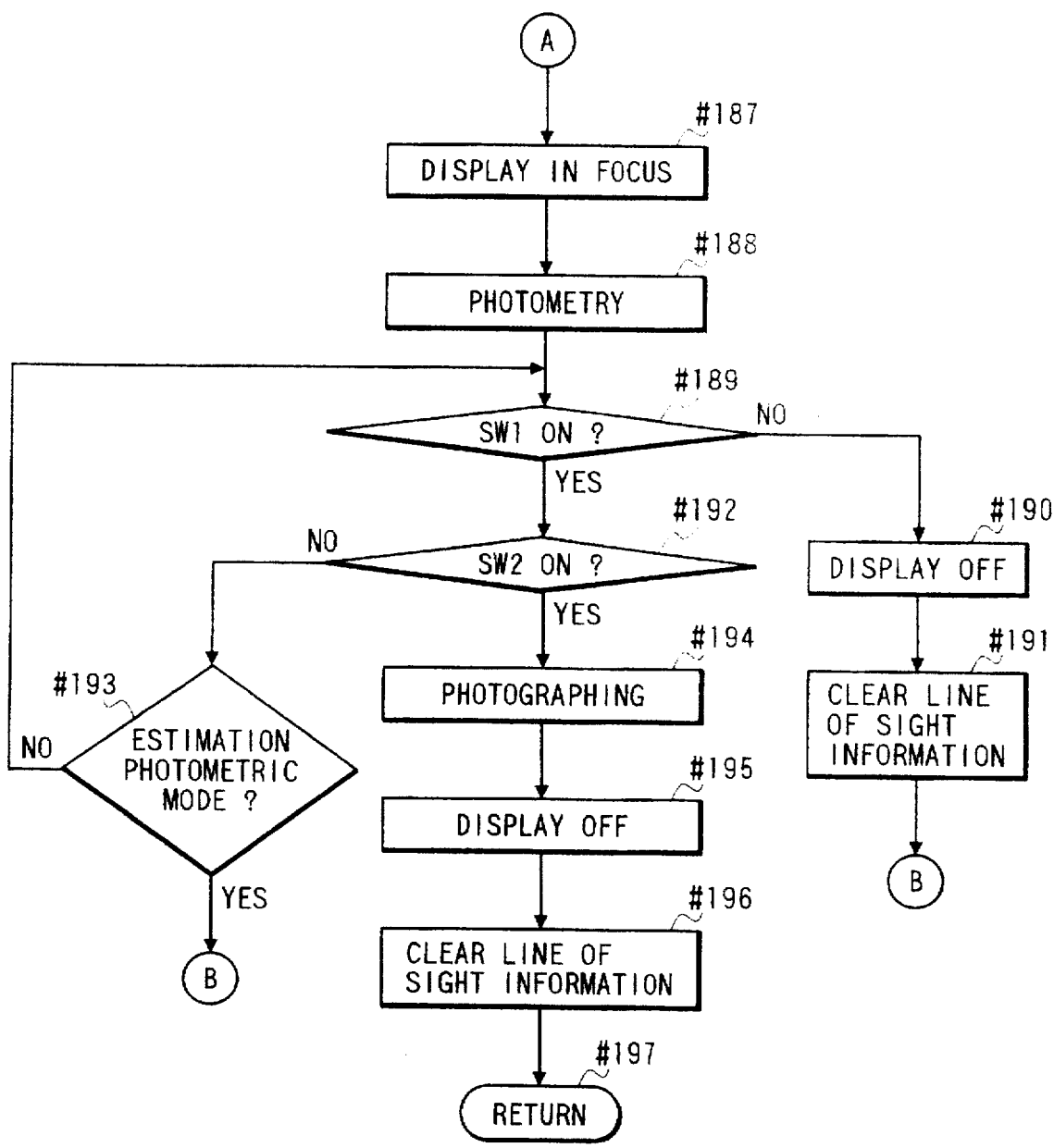
FIG. 11, which is comprised of FIGS. 11A and 11B, is a flow chart showing the operation of the camera shown in FIG. 10.
Figure 12A:
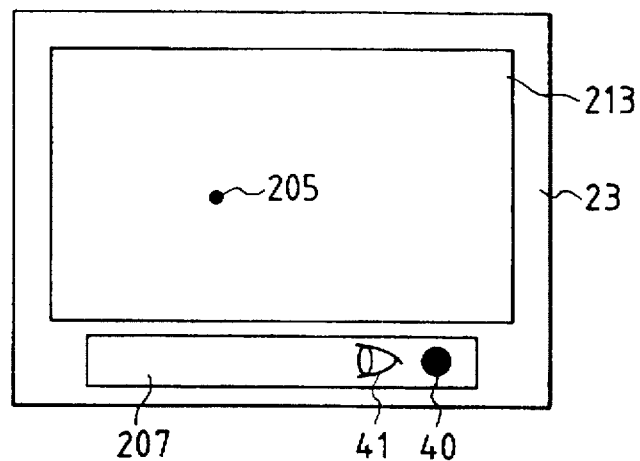
FIGS. 12A and 12B are views showing display examples in the finder to help explain the operation in FIGS. 11A and 11B.
Figure 12B:
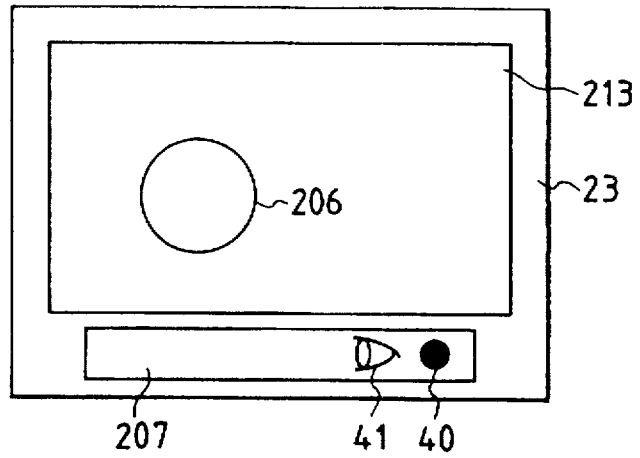

FIGS. 10 to 12B show the fourth embodiment of the present invention. FIG. 10 is a schematic sectional view showing the arrangement of principal part of a camera with line of sight detection means, FIGS. 11A and 11B are flow charts showing the operation of the camera, and FIGS. 12A and 12B are views showing the finder field. Note that the electrical circuit arrangement of the camera is the same as that shown in FIG. 3.

The same reference numerals in the camera shown in FIG. 10 denote the same parts as in the camera shown in FIG. 1, and a detailed description thereof will be omitted. In FIG. 10, a transmission type liquid crystal display element 27 is disposed in the vicinity of the focusing plate 7, and is controlled by the LCD driving circuit 105.

In this embodiment as well, the line of sight detection optical system including the IREDs 13a to 13d for illuminating the eyeball of the photographer with light, the dichroic mirror 11a for receiving light reflected by the eyeball, the light-receiving lens 12, and the image sensor 14, the line of sight detection circuit 101, the CPU 100, and the EEPROM 101a in the electrical circuit correspond to the line of sight detection means.

On the other hand, the photometry means for determining an exposure value comprises the imaging lens 9, the photometry sensor 10, the photometry circuit 102 for controlling the driving operation of the photometry sensor 10, and the CPU 100, and measures the object luminance in the observation screen to determine the exposure amount to the film 5. The photometry means allows "spot photometry" and "evaluation photometry" operations. In the spot photometry mode, the exposure amount to the film is determined on the basis of photometry information of one local region input based on the line of sight information of the photographer. On the other hand, in the evaluation photometry mode, the exposure amount to the film is determined by weighting photometry information of a plurality of photometric regions input based on the line of sight information of the photographer.

The display means comprises the transmission type liquid crystal display element 27, and the LCD driving circuit 105.

The operation of the camera with the line of sight detection means will be described below with reference to the flow chart in FIGS. 11A and 11B using FIGS. 12A and 12B showing the finder field.

When the photographer starts the camera, the CPU 100 checks the state of the switch SW-1, which is turned on at the first stroke position of the shutter release button, via the signal input circuit 104 (#180). If the switch SW-1 is not ON, the CPU 100 waits until the switch SW-1 is turned on (#180).

Thereafter, when the switch SW-1 of the shutter release button is turned on (#180), the CPU 100 detects the line of sight of the photographer (#181). The CPU 100 supplies a signal to the line of sight detection circuit 101 to pick up an image of the eyeball 15 of the photographer. The CPU 100 extracts feature points of the eyeball image by processing the image obtained from the image sensor 14 via the line of sight detection circuit 101, and calculates the line of sight of the photographer on the basis of the positions of the extracted feature points of the eyeball image. Furthermore, the CPU 100 calculates the gazing point on the focusing plate 7 on the basis of the calculated line of sight of the photographer.

Upon completion of the line of sight detection of the photographer (#181), the CPU 100 detects the state of the dial (not shown) via the signal input circuit 104 to confirm the current operation mode of the photometry means. Then, the CPU 100 displays a photometric region on the basis of the line of sight information in correspondence with the current operation mode (#182).

If the photometry means is set in the spot photometry mode, the CPU 100 transmits a signal to the LCD driving circuit 105 so as to control the transmission type liquid crystal display element 27 to display the position of the gazing point of the photographer, detected in the above step, as a photometric point in the finder field.

FIG. 12A shows the finder field when the photometry means is set in the spot photometry mode. In FIG. 12A, a photometric point 205 is displayed based on the gazing point information of the photographer.

On the other hand, if the photometry means is set in the evaluation photometry mode, the CPU 100 transmits a signal to the LCD driving circuit 105 so as to control the transmission type liquid crystal display element 27 to display a plurality of pieces of gazing point information of the photographer, detected in the above step, as a photometric area in the finder field.

FIG. 12B shows the finder field when the photometry means is set in the evaluation photometry mode. In FIG. 12B, a photometric area 206 is displayed based on the gazing point information of the photographer.

Subsequently, the CPU 100 selects a focus detection region closest to the coordinate position of the gazing point of the photographer (#183). Furthermore, the CPU 100 transmits a signal to the focus detection circuit 103 to execute focus detection of the focus detection region selected based on the line of sight information of the photographer (#184). The CPU 100 transmits a focus adjustment signal to the lens driving circuit 110 on the basis of the detected focus adjustment information, thus performing focus adjustment of the phototaking lens 1 (#185).

After the focus adjustment of the phototaking lens, if the focusing state of the selected focus detection region has not reached an in-focus state (#186), the CPU 100 transmits a focus adjustment signal to the lens driving circuit 110 to perform focus adjustment of the phototaking lens 1 again (#185).

If the focusing state of the selected focus detection region has reached an in-focus state (#189), the CPU 100 transmits a signal to the LCD driving circuit 105 so as to control the LCD 24 in the finder to perform an in-focus display (#187). In this case, the in-focus mark 40 shown in FIGS. 12A and 12B is displayed, and is controlled to be lighted on during the in-focus state of the phototaking lens.

Furthermore, the CPU 100 transmits a signal to the photometry circuit 102 to perform a photometry operation (#188). At this time, if the operation mode of the photometry means is set in the spot photometry mode, the exposure amount to the film is set on the basis of the photometric value at the photometric point set based on the line of sight information of the photographer. On the other hand, if the operation mode of the photometry means is set in the evaluation photometry mode, the exposure amount to the film is set by weighting, based on the line of sight information, the photometric value of the photometric area set based on the line of sight information of the photographer.

If the switch SW-1 of the shutter release button is kept ON (#189), the CPU 100 checks the state of the switch SW-2 of the shutter release button (#192).

If the switch SW-2 is turned on (#192), the CPU 100 transmits a signal to the shutter control circuit 108 to drive the shutter curtains based on the film exposure value calculated by the photometry means, thus performing a phototaking operation (#194). Upon completion of the shutter release operation of the camera (#194), the displayed mark in the finder is turned off (#195), and the line of sight information detected so far is cleared (#196). Then, the control returns to the initial waiting state (#197).

On the other hand, if the switch SW-2 of the shutter release button is OFF (#192), and the photometry means is set in the evaluation photometry mode (#193), the control returns to the initial state. If the switch SW-1 is kept ON (#180), the line of sight detection of the photographer is continued (#181).

On the other hand, if the photometry means is not set in the evaluation photometry mode (#193), the CPU 100 checks the state of the switch SW-1 of the shutter release button again (#189). If the switch SW-1 is not in the ON state (#189), the CPU 100 transmits a signal to the LCD driving circuit 105 so as to control the transmission type liquid crystal display element 27 to turn off its display (#190). Furthermore, the line of sight information detected so far is cleared (#191), and the control waits until the switch SW-1 of the shutter release button is turned on again (#180).

Note that a mark 41 indicating that the line of sight detection is being performed is effectively displayed on the LCD 24 in the finder during detection of the line of sight of the photographer, as shown in FIGS. 12A and 12B.

(Modification)

In the above description, the present invention is applied to cameras such as a single-lens reflex camera, a lens-shutter camera, a video camera, and the like. However, the present invention can also be applied to other optical equipments, other apparatuses, and a constituting unit of a certain apparatus.

Therefore, in the above embodiments, the focus adjustment means and the photometry means are exemplified as means that operates based on the line of sight information. However, the present invention is not limited to these means, but may be applied to any other means as long as they can execute operations in a plurality of operation modes.

What is claimed is:

1. An optical apparatus, comprising:

a line of sight detection device that detects a line of sight of an operator;

a display device that displays a position of the line of sight detected by said line of sight detection device; and a control device that controls said apparatus in a first control mode or a second control mode, wherein in each of the first control mode and the second control mode said control device controls said apparatus based on information corresponding to the line of sight detected by said line of sight detection device; and a selection circuit that selects either the first control mode or the second control mode, wherein said display device varies a state of display of the position of the line of sight in accordance with the control mode of said control device selected by said selection circuit.

2. An optical apparatus according to claim 1, wherein said display device comprises a display element which performs either a light-on display or a flicker display, and wherein said display device light-on displays the position of the line of sight in the first control mode and flicker-displays the position of the line of sight in the second control mode.

3. An optical apparatus according to claim 1, wherein said display device prevents a display element of the display device from displaying the position of the line of sight in accordance with the control mode selected by said selection circuit.

4. An optical apparatus according to claim 1, wherein said display device varies a size of a display representing the position of the line of sight in accordance with the control mode of said control device selected by said selection circuit.

5. An optical apparatus according to claim 1, further comprising:

a second display device that displays that the line of sight is being detected when said line of sight detection device is detecting the line of sight.

6. An optical apparatus according to claim 1, wherein said control device is a focus adjustment device that performs a focus adjustment operation on the basis of information of the line of sight, wherein in the first control mode said focus adjustment device terminates a focus adjustment operation when an in-focus state is detected, and wherein in the second control mode said focus adjustment device repeats the focus adjustment operation when an in-focus state is detected.

7. An optical apparatus according to claim 1, wherein said control device comprises a photometry device that performs a photometric operation on the basis of information of the line of sight, wherein in said first control mode said photometric device performs a photometric operation based only on information of the position of the line of sight, and wherein in said second control mode said photometric device performs the photometric operation based on information of the position of the line of sight and information of a peripheral area of the position of the line of sight.

8. An optical device according to claim 6, wherein said display device comprises a display element which can perform either a light-on display or a flicker display, and said display device flicker-displays a display element at the position of the line of sight when said control device is in the second control mode.

9. An optical apparatus according to claim 6, wherein said display device prohibits display of the position of the line of sight by said display element in accordance with the control mode of said focus adjustment device selected by said selection circuit.

10. An optical apparatus according to claim 1, wherein said display device displays the position of the line of sight by displaying a visual mark corresponding to a region including the position of the line of sight.

11. An optical apparatus according to claim 1, wherein said display device displays the position of the line of sight by displaying a visual mark closest to the region including the position of the line of sight.

12. A device for detecting line of sight, comprising:

a) line of sight detection means for detecting a line of sight of a user;

b) display means for displaying a position of the line of sight detected by said line of sight detection means; and c) display control means for controlling the display means to display the line of sight position only when a current line of sight position detected by said line of sight detection means is different from a previous line of sight position detected by said line of sight detection means.

13. A device according to claim 12, further comprising:

input means for inputting information from an apparatus to which said device is connected; and inhibition means for inhibiting an operation of said display control means in accordance with the information input to said input means.

14. A device according to claim 11, wherein said display control means and said inhibition means comprise a microcomputer for executing a predetermined algorithm.

15. A device according to claim 12, wherein said display device displays the position of the line of sight by displaying a visual mark corresponding to a region including the position of the line of sight.

16. A device according to claim 12, wherein said display device displays the position of the line of sight by displaying a visual mark closest to the region including the position of the line of sight.

17. A device for detecting line of sight, comprising:

a) a line of sight detection circuit for detecting a line of sight of a user;

b) a display member for displaying a position of the line of sight detected by said line of sight detection circuit; and c) a display control circuit for controlling said display member to display the line of sight position only when a current line of sight position detected by said line of sight detection circuit is different from a previous line of sight position detected by said line of sight detection circuit.

18. A device according to claim 13, further comprising:

an input port for inputting information from an apparatus to which said device is connected; and an inhibition circuit for inhibiting an operation of said display control circuit in accordance with the information input to said input port.

19. A device according to claim 18, wherein said display control circuit and said inhibition circuit comprise a microcomputer for executing a predetermined algorithm.

20. An optical apparatus having line of sight detection device, comprising:

a line of sight detection device that detects a line of sight of a user;

a display device that displays a position of the line of sight detected by said line of sight detection means;

an operation device that operates in a plurality of operation modes on the basis of information of the line of sight detected by the line of sight detection device; and a display control device operable, when said operation device operates in a predetermined operation mode, to control said display device to display the line of sight position only when a current line of sight position detected by said line of sight detection device is different from a previous line of sight detection position detected by said line of sight detection device.

21. An optical apparatus according to claim 20, wherein said operation device comprises a focus adjustment device that performs a focus adjustment operation on the basis of information of the line of sight, and said focus adjustment device has a first operation mode which repetitively performs said focus adjustment operation after an in-focus state is detected.

22. An optical apparatus according to claim 21, wherein when said focus adjustment device is operable in said second operation mode, said display control device controls said display device to display a line of sight position only when a current line of sight position detected by said line of sight detection device is different from a previous line of sight detection position detected by said line of sight detection device.

* * * * *

UNITED STATES PATENT AND TRADEMARK OFFICE
CERTIFICATE OF CORRECTION

PATENT NO.   : 5,752,090

DATED        : May 12, 1998

INVENTOR(S)  : AKIHIKO NAGANO, ET AL.

It is certified that error appears in the above-identified patent and that said Letters Patent is hereby corrected as shown below:

ON THE COVER PAGE

AT [57] - ABSTRACT:

Line 8, "the" (first occurrence) should read --a--.

COLUMN 17:

Line 1, "operates" should read --operate--; and
Line 10, "device; and" should read --device;--.

COLUMN 18:

Line 19, "the" should read --said--;
Line 31, "claim 11," should read --claim 13,--; and
Line 54, "claim 13," should read --claim 17,--.

Signed and Sealed this

Fifteenth Day of December, 1998

Attest:

BRUCE LEHMAN

*Attesting Officer*    Commissioner of Patents and Trademarks